March 2, 1965  J. S. METCALF ET AL  3,171,350

BIAXIALLY ORIENTED PLASTIC SHOTSHELL

Filed April 27, 1964

INVENTORS:
JOHN S. METCALF
CHARLES E. MILLER
ROY C. OLNEY

BY Donald R. Motsko

ATTORNEY

United States Patent Office 3,171,350
Patented Mar. 2, 1965

3,171,350
BIAXIALLY ORIENTED PLASTIC SHOTSHELL
John S. Metcalf, New Haven, Charles E. Miller, Hamden, and Roy C. Olney, North Haven, Conn., assignors to Olin Mathieson Chemical Corporation, a corporation of Virginia
Filed Apr. 27, 1964, Ser. No. 362,698
10 Claims. (Cl. 102—43)

This invention relates to the manufacture of strenghened bodies of crystalline plastics and specifically to the manufacture of hollow bodies such as the entire casing of shotshells or of other shell tubes from polyolefins to obtain a desired variation of structure and properties from end to end for the purpose.

This application is a continuation-in-part of our copending application, Serial Number 171,729, filed February 7, 1962, now abandoned, which is in turn a continuation-in-part of our copending application, Serial Number 135,569, filed September 1, 1961.

Shotshells have conventionally been made as a composite article including a metal head, a tube, usually of paper, a perforated plug in the base, and a overshot closure for the contents of shot projectiles, propellant and various wadding. As an improvement, it was proposed in U.S. Patent Number 2,232,634 to make a shotshell casing of cellulose ethers or esters such as cellulose acetate together with suitable plasticizers and fillers with the discharge end of this casing being sealed by fusion to a closure wad of the same material. But because of the shortcomings of many plastics, such as embrittlement, contamination, and distortion resulting from loss of fugitive plasticizers and such as the lack of adequate strength, plastic construction has not been very successful in articles likely to be put to severe usage, particularly after long storage. With most plastics, such as the first commonly known type of polyethylene, their use in shotshells has required special modifications such as inclusion of the collar of U.S. Patent Number 2,953,990 found to minimize the likelihood of failure in the case sidewall during firing. Especially with conventional, high pressure polyethylenes, such shells, unless they be suitably modified at added cost, tend to pull apart in the side wall and occasionally split lengthwise even down into the head upon firing.

In an effort to overcome the disadvantages of the use of various plastics and of separate components such as paper in shotgun shells, and in an attempt to realize the benefits of plastics such as polyethylene, those skilled in the art have tried the more rigid linear polyethylene. One approach has been to make the entire shotgun shell casing as one piece, molded from linear polyethylene having a high degree of crystallization, a melting point of at least 125° C. and a relatively high density. Articles made this way by injection molding a piece of linear polymer, however, have been found to fail at normal and low temperatures when the rate of tensile strain is high as it is in ammunition cases, at the yield point, instead of elongating and recovering for satisfactory extraction from the gun barrel as a sound piece. For various reasons such as the differences in thickness and forces encountered in various sections of the shell, making it by plastic injection molding even by this approach has limitations and leaves much to be desired in obtainment of the best combination of physical properties.

Another approach has been to substitute a section of tube of such linear low pressure polyethylene for the paper tube, but not until the polymer has been oriented uniformly from end to end by stretching a tube of it to develop added strength moderately and substantially uniformly in the rigid high density linear polyolefin.

It will be appreciated that ammunition cartridges are put to rigorous use as in the firing of a shotshell case where great forces are exerted with non-uniformity and over a wide range of temperatures. Despite the deficiencies of paper in resisting charring and scuffing, in resisting occasional severance from impact, in resisting dimensional change from variation in moisture content, in preventing absorption of moisture, many of which limit the paper shell in its capacity for re-use, various plastic materials tried have shown disadvantages, especially after periods of long storage, and exaggerated; these disadvantages have seriously precluded their general use for this purpose.

One object of this invention, therefore, is to provide plastic bodies of improved effective tensile strength together with a satisfactory elastic limit and yield strength.

Another object is the provision of a novel process and blank for making such bodies economically by deformation of a blank of plastic in the solid state.

Another object is to provide an article composed of a crystalline polymer of a thermo-plastic synthetic resin formed in such a way that exceptionally high strength is obtained with desired variation adapting the article for use as a container under explosive pressure.

Another object is to economically form plastic articles having adequate strength in those portions subjected to the greatest stress.

Still another object is specifically to provide a new and improved reloadable plastic shotshell, particularly one of a suitable polyolefin.

Other objects and advantages are evident from a description of preferred embodiments, taken in connection with the accompanying drawings wherein.

Figure 1:
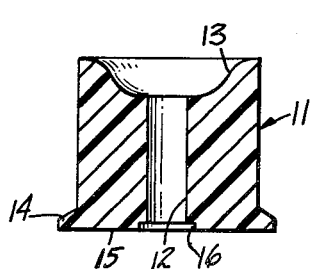
FIGURE 1 is an elevational view in cross section showing one embodiment of a blank or slug suitable for forming into a shotshell casing according to this invention.

In accordance with this invention, articles of manufacture, such as shotshell bodies, are formed at least in part by compression from crystalline plastic materials such as polyethylene, polypropylene and the like polymers, and/or co-polymers of the same, all finally shaped in the solid crystalline state. High density linear polyolefins specifically are contemplated for forming by compression as distinguished from forming by stretching. By confining a plastic blank between at least two juxtaposed surfaces, exerting pressure on the blank, and by driving plastic with plastic, final shaping to a thin-walled elongated body is achieved advantageously from a relatively thick slug or blank of the linear polymer. The finished article attains a very high increase in tensile strength of the body, which increases from the base to the mouth while the side wall thickness from the base toward the mouth of the shell decreases.

Compression forming is done at a wide range of working temperatures below the crystalline melt temperature of the plastic material and at speeds of compression deformation limited to prevent an excessive rise in temperature, which is maintained preferably at an elevated temperature range less than the crystalline melt temperature of the plastic. For polyethylene the working temperatures are held well below the range from about 257° F. to about 265° F., and working occurs preferably from about 200° F. to slightly below 265° F. for available grades and makes of the thermoplastic, working at about 240° F. being found suitable for most materials of this type. For polypropylene, the limiting temperature is somewhat higher and forming occurs below the much wider range from about 275° F. to about 330–335° F. Somewhat higher working temperatures from about 200° F. up to slightly less than 335° F. are contemplated. By compression forming according to this invention, shaping of an article by deformation from a blank can occur over a broad range of temperatures below the crystalline melt temperature, rather than in a sharply limited narrow range of temperature hovering extremely close to such crystalline melt temperature, and difficult to maintain.

The crystalline melt temperature, of thermoplastic materials such as those contemplated for use in this invention, is the elevated temperature at which all crystallinity of the polymer structure disappears and it appears clear when viewed through crossed Nichol prisms in a hot-stage microscope. The degree of crystallinity, as determined by various methods such as the X-ray diffraction method, is preferably as high as possible for each material; for polypropylene a high degree of isotacticity is also preferred along with maximum possible crystallinity.

By compression deformation to obtain an increase in tensile strength instead of stretching, necking of the thermoplastic material is avoided and very high tensile strength is obtained in the areas of greatest stress. In shotshells, this is the area of the mouth. Compression forming also allows the various parts of the finished article to be made to different finished dimensions, an advantage which is not secured when material must be stretched out of one part depleting it to supply another as the finished product.

It will be appreciated that this invention is especially of advantage in making in one piece an article having at least two portions differing in shape and function, at least one of which must be stronger than another or which must be thicker than other parts which nevertheless must be nearly as strong or stronger. By this invention, a superior shell tube is formed or preferably a superior whole shell case.

Figure 5:
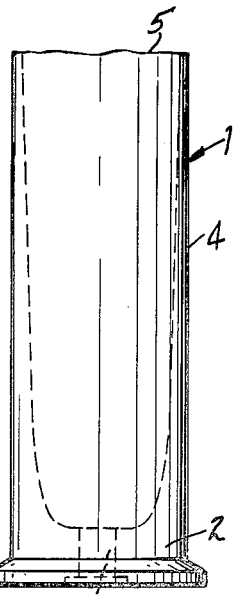
FIGURE 5 is a side view of a shotshell casing according to this invention removed from the forming apparatus shown in FIGURE 4.
Figure 4:
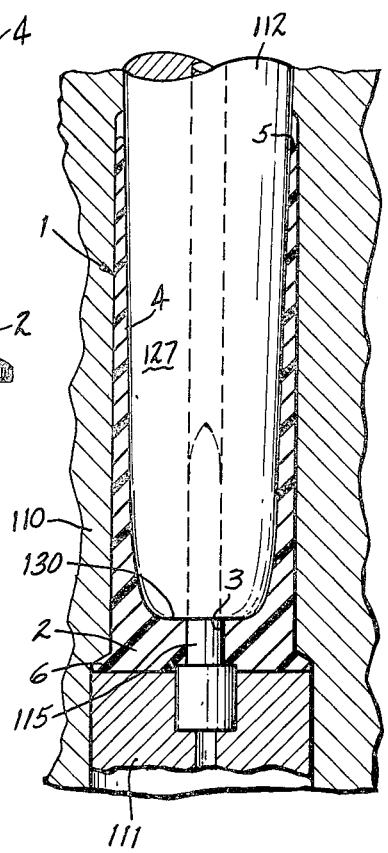
FIGURE 4 shows in cross section a portion of one suitable apparatus for processing the blanks to form the substantially completed shotshell casing also shown in cross section.

According to this invention, a shotshell casing 1, such as is shown in FIGURES 4 and 5, is formed by compressively deforming a blank of crystalline plastic material such as high density polyethylene. The shotshell casing as seen in FIGURES 4 and 5 consists of a relatively thick base 2 which surrounds a central primer receiving aperture 3. A relatively thin tubular sidewall 4 integral with the base is tapered in thickness from the base to an open mouth 5 of the casing. An extractor rim 6 projects radially outwardly of the base and is integral therewith.

Figure 2:
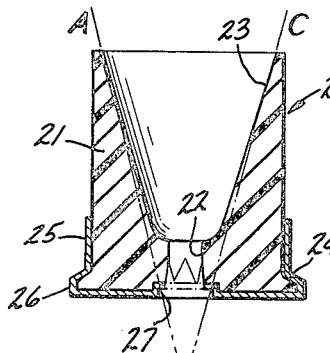
FIGURE 2 is an elevational view in cross section showing a second embodiment of a blank contemplated for use in this invention.
Figure 3:
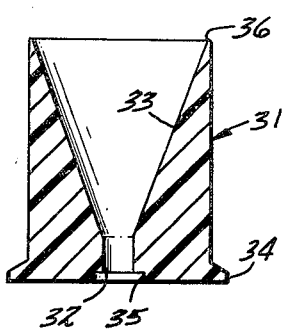
FIGURE 3 is an elevational view in cross section showing a preferred embodiment of a blank suitable for use with this invention.

Typical blanks which may be used to form the shotshell casing 1 are shown in FIGURES 1–3.

As shown in FIGURE 1, the blank 11 is a relatively thick cylindrical slug in the form of a cup or thick-walled tube having a central bore 12. One end 15 of the blank 11 is recessed at 16 to receive a primer while the other end 13 is contoured or dished to adapt this end of the blank for axial compression forming. A shotshell rim 14 is formed adjacent end 15 for shell extraction. End 15 of the blank 11 corresponds in size and shape to the base 2 of the finished shell shown in FIGURES 4 and 5.

Another blank 20 is shown in FIGURE 2, in which the plastic core 21 is formed symmetrically about primer opening 22. The core 21 may be seated in a metallic shotshell head. The metallic head is a thin metal jacket 25 rimmed at 26 to accommodate the rim 24 of the blank and indented inwardly at the bore forming there a primer retaining flange or fingers 27. Blank 20 is provided with a prolate concavity such as the parabolic or hyperbolic recess 23 having an interior surface asymptotic or tangential to the sides of the included angle ABC of about 40°, at B, i.e., an angle of from about 15° to about 25° with a side as at A and C.

In FIGURE 3 is shown another blank 31 similar to the FIGURE 2 embodiment. Blank 31 is provided with a central primer aperture 32 and an internal concavity which flares conically at 33 forming an angle of about 20° at the edge 36. Concentrically with opening 32 and the tapered concavity 33, the blank has rim 34 and the primer rim countersink 35. The end of the blank 31 adjacent rim 34 also corresponds in size and shape to the base 2 of the finished shell casing shown in FIGURES 4 and 5.

The blanks described above may be cut and machined from extruded rod and/or tubing or may preferably be injection molded in a die. The blank of FIGURE 2 may advantageously be made by injection molding the blank directly into a rimmed metal cup 25 of final finished size lining the injection molding die.

The apparatus for forming a blank into a shotshell casing according to this invention is described in detail in copending application Serial Number 135,569, filed September 1, 1961 and is described briefly below. The primary parts as seen in FIGURE 4 are the hollow die body 110 for receiving the thermoplastic blank, the die base 111 forming an abutment at one end of body 110, and the forming punch 112. The punch 112 cooperates with a reduced extension 115 for sizing the primer receiving bore formed in the blank.

According to the process by which the shotshell of this invention is formed, the punch 112 is driven into the die body 110 to compress a plastic blank positioned in the die body. The speed at which punch 112 is driven is far below the high impact extrusion speeds encountered in metal forming, which are capable of causing liquefaction of the material impacted, a condition avoided in the process.

Punch 112 is preferably provided intermediate its ends with a tapered outer surface 127 uniformly tapered on a side to converge toward the end 130 of the punch which may be nearly flat ended as shown in FIGURE 4 or rounded to give the desired interior configuration to the finished shotshell. The die cavity may also be made to converge by a uniform taper or may be straight-walled as desired.

In forming a shotshell casing according to this invention, a thermoplastic blank such as blank 31 shown in FIGURE 3 formed of linear high density polyethyene, is placed in die body 110 after the apparatus as well as the blank has been heated through and through in any suitable manner as by immersion to a working temperature of about 240° F. Temperatures as low as 70° F. have been tried and are workable but at least 200° F. is preferred. The rigid polyethylene blank, preferably after being given a coating of a suitable lubricant such as ethylene glycol, is then compressed by punch 127 to form the shotshell case 1 shown in FIGURE 4. No part of the case is subjected to drawing or stretching or extrusion, as these are conventionally practiced in the resinous plastic industry. The finished casing is formed entirely by compressive deformation of the blank.

As shown in FIGURE 4, the finished cartridge case of rigid polyolefin consists of a relatively thin sidewall 4 projected out of the slug and a rather bulky base 2 surrounding the primer opening. Base 2 retains substantially the configuration of the base of the blank. The primer opening in finished base 2 is sized and shaped by punch 115 during the forming operation. Integral and concentric with base 2, the finished tubular sidewall 4 is comprised of highly deformed and oriented thermoplastic material which has been projected out of the blank and severely worked during the forming operation to obtain a substantial increase in tensile strength over the tensile strength of the original blank. The tensile strength of the sidewall increases from the base to the open mouth of the tube.

A tapered sidewall has been found to be best for compressive forming and best for a shotshell although a shotshell made according to the process disclosed and having straight sidewalls is also contemplated. As seen in FIGURE 4, the finished sidewall is thickest adjacent the head and terminates in a thinnest part at the open end 5 where the shell is adapted by this thinness for any suitable closure. The shell formed according to this invention is adapted especially for closure by in-folding and sealing integrally with the rest of the shell case or by any other equivalent closure of evanescent character as disclosed in U.S. Patent Number 2,582,125 granted to R. S. Holmes.

A shotshell casing formed according to this invention has no need for separate heat-setting treatments such as a dimension fixing heat treatment required by other known processes.

As noted above, the finished shotshell formed according to this invention and shown in FIGURE 5 is comprised of a relatively thick base 2 and a relatively thin integral sidewall 4 which tapers and decreases in thickness from the base to an open mouth portion 5. The base 2 is substantially of the same size and shape as the base portion of the original blank from which the shell is formed. The relatively thin sidewall 4 is formed from the relatively thick sidewall of the blank which is substantially elongated longitudinally and stretched circumferentially by the tapered punch to provide a shotshell casing having a relatively thin sidewall of substantially increased longitudinal and circumferential tensile strength.

The longitudinal tensile strength of the finished shotshell casing varies from the base, where the tensile strength is in the 3,000–4,000 p.s.i. range to the open mouth of the tube where the tensile strength is increased 3–10 times and ranges from about 17,000–37,000 p.s.i. and higher. Between the base 2 and the mouth 5, the tensile strength varies upwardly from the value at the base to the value at the mouth.

In a typical shotshell casing formed according to this invention from high density linear polyethylene and in which the tensile strength at the mouth 2⅝ inches from the base is 35,000 p.s.i.; the tensile strengths would range from the base to the mouth as shown below.

| Distance above base exterior (inches): | Longitudinal tensile strength (p.s.i.) |
|---|---|
| ¾ | 19,215 |
| 1¼ | 21,725 |
| 1¾ | 25,145 |
| 2¼ | 28,800 |
| 2⅝ | 35,000 |

The example described above is illustrative and not limiting since it is cited merely to show the range in tensile strengths in the body of a typical shotshell formed according to this invention.

It should be noted at this point that the tensile strength of the shotshell casing at the base is substantially the tensile strength of the undeformed base of the original blank. From the juncture at the base to the open mouth of the tube, which is about 2⅝ inches above the base in a typical shotshell, the tube sidewall is tapered and decreases in thickness. The tensile strength of the tube; however, is greatest at the mouth where the tube is thinnest in cross section. This is possible since the plastic material at the mouth is the material which has been worked most severely and has therefore been oriented the most.

Since the amount of work done on the plastic material has a direct relationship to the amount of orientation and hence the increased tensile strength, it is possible to produce shotshell casings and other containers according to this invention in a wide range of tensile strengths.

It has been found that shotshell casings having a longitudinal tensile strength ranging from about 17,000–37,000 p.s.i. at the mouth are readily obtainable according to this invention. A tensile strength of at least 22,000 p.s.i. at the mouth is preferred if the shotshell is to be reloadable a number of times. By varying the shape of the blank and the material of which it is comprised, it is possible to vary the amount of work which must be done to arrive at a finished shotshell, and hence to vary the tensile strength which will be imparted to the tubular body of the shotshell. Tensile strengths as high as 50,000 p.s.i. at the mouth of a tube have been produced according to the method described herein. It is contemplated that strengths of over 50,000 p.s.i. at the mouth are readily obtainable by this method if desired.

The circumferential tensile strength of the shotshell casings formed according to this invention are increased to a range of 4,500 to 6,000 p.s.i. In forming a shotshell according to this invention, the plastic material is stretched circumferentially by the tapered punch only a relatively small amount. By varying the shape of the punch, or the preformed blank or both, it is possible to increase the amount of strength in the circumferential direction and thereby increase the circumferential tensile strength above 6,000 p.s.i. if desired. An increased circumferential tensile strength above 6,000 p.s.i. is not found to be necessary in a shotshell. In other container structures which would require an increased circumferential tensile strength; the tensile strength properties could be varied by the method described herein to produce the desired structure.

In determining the longitudinal tensile strength properties of shotshells made according to this invention, tensile strength measurements were made on samples as described in A.S.T.M. method D-1822-61T-Specimen Type S. Testing was conducted in a Model TTB Instrom unit with a D load cell at chart and crosshead speeds of 2 inches/minute. Tensile strengths were calculated from maximum loads which occurred at the yield point.

The flow rate and melt index of the material tested were as determined by A.S.T.M. method D-1238-57T.

While it is contemplated that articles be made according to this invention essentially from polyethylene, polypropylene, other olefinic polymers and their copolymers, the plastic may be compounded with small amounts of suitable antioxidants, coloring agents, opacifiers, and fillers such as those described in U.S. Patent Number 2,466,038.

The finished rigid polyethylene case made as described herein is not only more waterproof than a conventional paper cartridge but also free from shrinkage and swelling as a result of moisture changes. The shell has dimensional stability even over a wide operative range of temperatures, is substantially scuffproof because of its elasticity, and being substantially free of fugitive antioxidants and plasticizers, it does not change in size and pliancy. The shell being of a self-lubricating character needs no extraneous lubricant. The shell and its powder charge do not suffer from migration of these components. In the side wall, closure end shootoffs are substantially eliminated by the permanently enhanced tensile strength which does not diminish on aging of the shell. The relatively thick base of the shell also functions as a base wad and eliminates the necessity for a separate base wad as required in conventional shotshells.

The tensile strengths of 17,000–37,000 p.s.i. readily achievable with linear polyethylene of the highest molecular weights, is considerably above the strength obtained by merely injection molding the most rigid form of the plastic. Toward the open end the tensile yield strength varies upwardly so that despite the decreased thickness of the wall there, the load bearing capacity does not fall off longitudinally as rapidly as with plastic tubing of uniform tensile strength from end to end.

It will be understood that while this invention is particularly applicable to the manufacture of shotshells, it is also applicable to making other hollow articles of the type open at least at one end.

Modifications can be made to produce a number of article embodiments with or without a flange and/or with or without the closed end.

While a shotshell casing having an integral base is preferred; the plastic base may be removed by cutting and a metal head substituted directly for the plastic head to form a suitable shotshell.

In all embodiments and examples, the distal end of the case remote from the base may be trimmed as necessary to provide the shape of edge desired, and different from that obtained by compressive deformation.

It will be further understood that those skilled in the art may make other changes and modifications in the embodiments now believed preferred without departing from the spirit and scope of the invention as set forth in the appended claims.

What is claimed is:

1. A plastic cartridge case for shotshells and the like including an integral base and tube, an aperture in said base for receiving and retaining a primer therein, said case having a longitudinal tensile strength which increases from the base where the tensile strength ranges from 3,000–4,000 p.s.i. to an open mouth of the tube where the tensile strength is in the 17,000–37,000 p.s.i. range, said tube having a generally constant outside diameter and an inside diameter which is tapered and increases from adjacent the base to said mouth.

2. A plastic cartridge case including a base of unoriented plastic and an integral tubular body comprised of a highly oriented plastic, said tubular body having a tensile strength which increases from adjacent the base where the tensile strength is 3,000–4,000 p.s.i. to an open mouth of said tubular body where the tensile strength is at least 17,000 p.s.i.; said tubular body having a sidewall the thickness of which decreases from adjacent said base to said open mouth, and a central primer opening formed in said base to accommodate a primer.

3. A cartridge case formed as a one piece unit from a blank of crystalline plastic material, said cartridge case including a relatively thick base portion surrounding a primer aperture, a relatively thin tubular sidewall formed integral with said base at one end and having a mouth portion adapted for infolding to form an integral closure at said other end, said relatively thick base portion being comprised of substantially unoriented plastic having a longitudinal tensile strength ranging from 3,000–4,000 p.s.i. and said relatively thin tubular sidewall being comprised of a highly oriented plastic having a longitudinal tensile strength which increases from the strength of unoriented plastic at the base to at least 17,000 p.s.i. at the mouth.

4. The cartridge case of claim 3 in which a metal jacket surrounds said relatively thick base portion.

5. A plastic casing comprising a relatively thin tubular body, a relatively thick base formed integral with one end of said tubular body, said tubular body having a tapered sidewall which decreases in thickness and increases in tensile strength from said one end to an open mouth at the other end, said tubular sidewall having a longitudinal tensile strength increasing from the strength of unoriented plastic at said one end to at least three times the strength of unoriented plastic at said other end.

6. The casing of claim 5 in which the circumferential tensile strength of said tubular body ranges from 4,500–6,000 p.s.i.

7. A biaxially oriented plastic ammunition shell case of high tensile strength formed by compressively deforming a blank to a final size and shape in an enclosed die, said case including a tubular sidewall tapering uniformly and decreasing in thickness from one end to the opposite end, said sidewall having a longitudinal tensile strength ranging from the strength of undeformed plastic at said one end to at least three times the strength of undeformed plastic at said opposite end.

8. The shell case of claim 7 in which the longitudinal tensile strength at said opposite end is at least 22,000 p.s.i.

9. A biaxially oriented plastic ammunition shell case of high tensile strength formed by compressively deforming a blank to a final size and shape in an enclosed die, said case comprising a relatively thick base with a central primer aperture, a relatively thin tubular sidewall extending longitudinally from said base and terminating in an open end, the interior of said sidewall tapering uniformly and decreasing in thickness from the base to the open end, said end being operative to fold inwardly to form a case closure, a rim extending outwardly from the base, said base, wall, and rim being integrally connected, said shell case having a longitudinal tensile strength ranging from the strength of undeformed plastic at the base to at least three times the strength of undeformed plastic at said open end.

10. The shell case of claim 9 in which the longitudinal tensile strength at said open end is in a range of from 17,000 p.s.i. to 37,000 p.s.i.

References Cited by the Examiner
UNITED STATES PATENTS

| | | | |
|---|---|---|---|
| 2,825,721 | 3/58 | Hogan et al. | 102—43 |
| 2,953,990 | 9/60 | Miller | 102—43 |
| 2,987,775 | 6/61 | Albrecht et al. | 102—43 |
| 3,007,407 | 11/61 | Broske | 102—38 |
| 3,103,170 | 9/63 | Covington et al. | 102—43 |
| 3,105,439 | 10/63 | Young | 102—43 |

BENJAMIN A. BORCHELT, *Primary Examiner.*

SAMUEL FEINBERG, *Examiner.*